United States Patent
Malyna et al.

(10) Patent No.: US 11,277,898 B2
(45) Date of Patent: Mar. 15, 2022

(54) RETROFIT LIGHT EMITTING DIODE, LED, LIGHTING DEVICE FOR CONNECTION TO A BALLAST, WHEREIN SAID LED LIGHTING DEVICE IS ARRANGED TO DETECT A DIP IN SAID MAINS VOLTAGE USING A ZERO CURRENT DETECTOR

(71) Applicant: SIGNIFY HOLDING B.V., Eindhoven (NL)

(72) Inventors: Dmytro Viktorovych Malyna, Achel (BE); Luna X Zhang, Eindhoven (NL); Yuanqiang Liu, Shanghai (CN); Marcus Cornelis Van Meel, Helmond (NL); Tijmen Cornelis Van Bodegraven, Eindhoven (NL); Raimundo De Heer Galisteo, Uden (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/628,213

(22) PCT Filed: Jul. 3, 2018

(86) PCT No.: PCT/EP2018/067961
§ 371 (c)(1),
(2) Date: Jan. 2, 2020

(87) PCT Pub. No.: WO2019/007966
PCT Pub. Date: Jan. 10, 2019

(65) Prior Publication Data
US 2021/0144828 A1    May 13, 2021

(30) Foreign Application Priority Data

Jul. 6, 2017 (WO) ................ PCT/CN2017/091937
Sep. 11, 2017 (EP) .................................... 17190278

(51) Int. Cl.
*H05B 45/48* (2020.01)
*H05B 45/50* (2022.01)
(Continued)

(52) U.S. Cl.
CPC ............. *H05B 45/50* (2020.01); *F21K 9/238* (2016.08); *H05B 45/34* (2020.01);
(Continued)

(58) Field of Classification Search
CPC ........ H05B 45/37; H05B 45/48; H05B 45/54; H05B 45/345; H05B 45/3578
See application file for complete search history.

(56) References Cited

U.S. PATENT DOCUMENTS

| 4,384,305 A | 5/1983 | Sonnenberger |
| 2010/0271802 A1 | 10/2010 | Recker et al. |

(Continued)

FOREIGN PATENT DOCUMENTS

CN          101637064 A     1/2010

*Primary Examiner* — Tung X Le
(74) *Attorney, Agent, or Firm* — Daniel J. Piotrowski (57) ABSTRACT

A retrofit Light Emitting Diode, LED, lighting device for connection to a ballast, wherein said ballast is arranged to be connected to a mains voltage and arranged to provide for a ballast current, wherein said LED lighting device is arranged to detect a dip in said mains voltage using a zero current detector.

11 Claims, 4 Drawing Sheets

(51) Int. Cl.
  *F21K 9/238* (2016.01)
  *H05B 45/34* (2020.01)
  *H05B 45/3578* (2020.01)
  *F21Y 115/10* (2016.01)

(52) U.S. Cl.
  CPC ......... *H05B 45/3578* (2020.01); *H05B 45/48* (2020.01); *F21Y 2115/10* (2016.08)

(56) References Cited

U.S. PATENT DOCUMENTS

| | | | |
|---|---|---|---|
| 2011/0121744 A1* | 5/2011 | Salvestrini | H02M 1/082 315/246 |
| 2012/0262082 A1* | 10/2012 | Esaki | H05B 45/14 315/224 |
| 2013/0221867 A1 | 8/2013 | Deppe et al. | |
| 2013/0278159 A1* | 10/2013 | Del Carmen, Jr. | H05B 45/3575 315/200 R |
| 2013/0320869 A1 | 12/2013 | Jans et al. | |
| 2015/0181667 A1 | 6/2015 | Tao et al. | |
| 2016/0128142 A1* | 5/2016 | Arulandu | H05B 45/3575 315/200 R |
| 2018/0139816 A1* | 5/2018 | Liu | H05B 45/37 |

\* cited by examiner

RETROFIT LIGHT EMITTING DIODE, LED, LIGHTING DEVICE FOR CONNECTION TO A BALLAST, WHEREIN SAID LED LIGHTING DEVICE IS ARRANGED TO DETECT A DIP IN SAID MAINS VOLTAGE USING A ZERO CURRENT DETECTOR

CROSS-REFERENCE TO PRIOR APPLICATIONS

This application is the U.S. National Phase application under 35 U.S.C. § 371 of International Application No. PCT/EP2018/067961, filed on Jul. 3, 2018, which claims the benefit of International Application No. PCT/CN2017/091937, filed on Jul. 6, 2017 and European Patent Application No. 17190278.6, filed on Sep. 11, 2017. These applications are hereby incorporated by reference herein.

BACKGROUND OF THE INVENTION

More efficient choices are being made in the field of energy consumption. One such field is that of lighting. The concept of Light Emitting Diodes, LEDs, and the capability to retrofit conventional lamps and lamp fixtures with LEDs have resulted in decreased energy consumption and saving in terms of reduced energy costs. Recently, retrofit LEDs have also been suggested to replace High Intensity Discharge, HID, lamps.

Such a retrofit process is usually a simple "plug and play" process, wherein the old HID lamp is replaced with the retrofit LED lighting device. An advantage of being able to replace HID lamps with retrofit LED lighting devices is the ability to retain the ballast that powered the HID lamp, thereby eliminating the need to replace the fixture and/or the need to rewire. Such a ballast usually comprises and/or is modelled by an inductor, and additionally a shunt capacitor for power factor correction.

The retrofit LED lighting device usually has a lower power rating than the HID lamp that it replaces. This has the impact that the ballast is rated for a much higher power and continues to supply said higher amount of power. This is managed internally in the retrofit LED lamp by certain electronic components. An example is to use a shunt switch, which shunts the excess amount of power thereby not transferring it to the LEDs itself.

A common phenomenon observed in grid connected electric circuits, is that of mains dip. A mains dip is the sudden reduction in the amplitude of the incoming voltage, for one of a few cycles of the input voltage. This sudden decrease in voltage may result in other related phenomena such as an increased inrush current, light flickering, etc.

SUMMARY OF THE INVENTION

It would be advantageous to achieve a Light Emitting Diode, LED, based lighting device that is capable of detecting a mains dip occurring in the input voltage to the ballast. It would further be advantageous to achieve a corresponding method of operating such an LED based lighting device.

To better address one or more of these concerns, in a first aspect of the present disclosure, there is presented, a retrofit Light Emitting Diode, LED, lighting device for connection to a ballast, wherein said ballast is arranged to be connected to a mains voltage and arranged to provide for a ballast current, wherein said LED lighting device is arranged to detect a dip in said mains voltage, said retrofit LED lighting device comprises:

at least one LED for emitting light;

a rectifier arranged for rectifying said ballast current and for providing a lamp current to said at least one LED;

a zero current detector arranged for detecting a zero value of said lamp current or of said ballast current;

a signal generator coupled to said zero current detector, wherein said signal generator is arranged for outputting a monotonic wave form signal starting from a base level, wherein said signal generator is arranged to reset said outputted wave form signal from a reset level to said base level upon a detected zero value by said zero current detector;

a control unit arranged for determining a dip in said mains voltage by determining that said outputted wave form signal crosses a voltage dip threshold after having passed said reset level.

It was one of the insight of the inventors that, in the case of retrofit LED lighting devices, it may not be able to detect a dip in the mains voltage, by monitoring the line input voltage. This is due to the fact that the LED lighting device is placed behind the ballast. Further, shunt switches may be utilized in the LED lighting device for short-circuiting the at least one LED. These shunt switches may also disturb the observation of the line input voltage through the ballast.

The inventors have found that the dip in mains voltage could be determined by monitoring the current that is output by the ballast. As such, in an accordance with the present disclosure, there is presented a retrofit LED lighting device which is arranged for detecting a dip in the mains voltage. It was found that a dip in the main voltage coincides with a distortion in the current provided by the ballast, i.e. the ballast current. More specifically, the ballast current may not have a zero crossing whenever a mains dip occurs. The present disclosure is directed to the concept of recognizing that an expected zero crossing of the ballast current did not occur, thereby establishing that a dip in the mains voltage has occurred.

The LED lighting device comprises a rectifier which is arranged for rectifying the ballast current which is alternating in nature in to a Direct Current, DC, lamp current.

A rectifier may comprise four switching elements. These switching elements may either be non-controllable—like a diode, or controllable—like a Metal Oxide Semiconductor Field Effect Transistor, MOSFET, Thyristor etc. For the purpose of the present disclosure, the switching elements are referred to as diodes, but it is noted that they may be replaced by other equivalent controllable or non-controllable switches with suitable additional control equipment where necessary.

Further, a zero current detector is provided, which zero current detector is arranged for detecting a zero value of said lamp current or of said ballast current. The zero current detector may be referred to as a zero crossing detector in case the zero current detector is arranged to detect the zero value in the ballast current, as the ballast current is characterized by an AC current waveform. Here, a zero crossing is defined as the point wherein the sign of the AC waveform changes, i.e. from a negative waveform to a positive waveform or vice versa. The lamp current, i.e. the current after the rectifier, is a DC current signal. In such a case, the detector is arranged to detect whether the current is zero, or approximately zero.

The zero current detector, ZCD, itself may be implemented using an Operational Amplifier, OpAmp, comparator in combination with a sense resistor. Such an implementation of a ZCD is well known to the person skilled in the art and hence not further elaborated here. It is also to be noted that the ZCD may be implemented using other equivalent means.

The ZCD is electrically coupled to a signal generator. The signal generator is arranged for outputting a monotonic waveform signal. A monotonic waveform is one which is entirely non-increasing or entirely non-decreasing. That is to say, within a specified timeframe of interest, the signal does not decrease (when the signal is non-decreasing) or the signal does not increase (when the signal is non-increasing). As an example, a ramp or sawtooth signal (wherein the signal amplitude increases corresponding to an increase in time) is a monotonic waveform.

The monotonic waveform is characterized in that it starts increasing (or decreasing) from a particular base level. Preferably, the base level corresponds to a zero magnitude level. Furthermore, the signal generator is arranged to be reset back to said base level when the ZCD detects a zero current level in the lamp current or the ballast current.

As an example, the signal generator outputs a non-decreasing waveform starting from a base level until the ZCD detects a zero in the ballast current. When such a detection occurs, the output of the signal generator is reset back to the base level and the cycle is repeated. Before being reset, the magnitude of the outputted wave form signal has usually reached a particular level, the reset level. It is noted that, typically, the signal generator is reset, periodically, at about the same level, i.e. the same reset level. This is owing to the fact that since the ballast current is a periodic signal, the zero current points also occur in a periodic manner. Therefore, the signal generator also generates a signal that is periodic. In this case, the amplitude of the outputted waveform signal becomes the reset level.

The exemplary embodiment further comprises a control unit which is arranged to determine the occurrence of a mains dip by determining that the magnitude of the signal generator has crossed said reset level and is at a voltage dip threshold level. When the control unit determines that the magnitude of the signal generator is at said voltage threshold level, the control unit establishes that a voltage dip in the mains input voltage has occurred.

The principle behind such a detection is that when there is a dip in the mains voltage, the input current may be maintained at a more or less constant level. This helps in ensuring that a constant amount of power is supplied to the ballast and consequently the lamp. Therefore upon occurrence of a dip in the mains voltage, the current level more or less remains at a particular level. This means that the ZCD does not detect a zero level for the time duration of a mains dip. In turn, the signal generator is not reset which results in the outputted wave form signal in reaching a voltage dip threshold level, thereby the control unit is able to successfully detect a dip in mains voltage.

In an example according to the present disclosure:
said signal generator is arranged for outputting a monotonic increasing wave form, and wherein said voltage dip threshold is higher than said reset level, or
said signal generator is arranged for outputting a monotonic decreasing wave form, and wherein said voltage dip threshold is lower than said reset level.

It was found that a monotonic waveform could either be non-decreasing or non-increasing. When said outputted wave form signal is a non-decreasing (monotonic increasing) one, the voltage dip threshold is higher than said reset level. Correspondingly, when said outputted waveform signal is a non-increasing one (monotonic decreasing), the voltage dip threshold is lower than said reset level.

In an example, the retrofit LED lighting device comprises:
a shunt switch for shunting said at least one LED such that said lamp current bypasses said at least one LED, and
wherein said control unit is further arranged for controlling said shunt switch based on said determined dip in said mains voltage.

It may be advantageous to not only detect a dip in mains voltage but also to take some corresponding action, thereby preventing, for example, any electric components from harmful effects caused as a result of the dip in the mains. One way to implement such preventive measure is to include a shunt switch and corresponding control means to control said shunt switch. Upon detection of a dip in the mains voltage, the shunt switch may be controlled by the control unit in such a way that the harmful effects caused as a result of the mains dip are reduced or mitigated.

The control unit may, for example, be a microcontroller or any other control device such as a microprocessor, a field programmable gate array, FPGA, or anything alike. The microcontroller may, for example, receive the relevant input signals at some of the available input pins and may be provide output control signals—to control the shunt switch, at other available output pins.

In an example, the control unit is arranged for:
deactivating said shunt switch triggered by a detected zero value,
deactivating said shunt switch triggered by said determined dip in said mains voltage, and
activating said shunt switch triggered by determining that said outputted wave form crosses said voltage dip threshold.

The advantage of the above described example is that the shunt switch is deactivated each time a zero value in the corresponding current is detected and in that the switch is deactivated each time a mains dip has occurred.

In an example, said voltage dip threshold is between 1.1 and 1.5, preferably between 1.1 and 1.2, times said reset level. The voltage dip threshold is suitably higher, for a system in which signal generator outputs a non-decreasing monotonic waveform, than the reset level. The relevant threshold levels are chosen such that the sensing equipment may operate with a suitable margin, thereby not causing false positives. In a system in which signal generator outputs a non-increasing wave form signal, the same ranges may be applied with the condition that the magnitude, or the absolute value, of the voltage dip threshold is between 1.1 and 1.5, preferable between 1.1 and 1.2, times the magnitude, or the absolute value, of the reset level.

In a second aspect of the invention, there is provided a lighting system, comprising:
a retrofit LED lighting device according to any of the examples as described above, and
a ballast, for example an electromagnetic ballast, connected to said retrofit LED lighting device.

It is noted that the advantages and definitions as disclosed with respect to the embodiments of the first aspect of the invention also correspond to the embodiments of the second aspect of the invention, being the lighting system.

In a third aspect of the invention, there is provided a method of operating a retrofit LED lighting device in accordance with any of the examples as provided above, wherein said method comprises the steps of:
rectifying, by said rectifier, said ballast current and providing a lamp current to said at least one LED;
detecting, by said zero current detector, a zero value of said lamp current or of said ballast current;
outputting, by said signal generator, a monotonic wave form signal starting from a base level, and resetting, by said signal generator, said output signal from a reset level to said base level upon a detected zero value by said zero current detector;

determining, by said control unit, a dip in said mains voltage by determining that said outputted wave form crosses a voltage dip threshold after having passed said reset level.

It is noted that the advantages and definitions as discloses with respect to the embodiments of the first and second aspects of the invention also correspond to the third aspect of the invention, being the method of operating a retrofit LED and detecting a dip in the mains voltage.

In an example, the step of outputting comprises any of:

outputting, by said signal generator a monotonic increasing wave form, outputting, by said signal generator a monotonic decreasing wave form.

In another example, the method further comprises the step of:

controlling, by said control unit, said shunt switch based on said determined dip in said mains voltage.

In an example, the method further comprises the steps of:

deactivating said shunt switch triggered by a detected zero value, deactivating said shunt switch triggered by said determined dip in said mains voltage, and activating said shunt switch triggered by determining that said outputted wave form crosses an activation threshold before said outputted wave form reaches said reset level.

In a further example of the method, said voltage dip threshold is between 1.1 and 1.5, preferably between 1.1 and 1.2, times said reset level.

The method may be effectively performed by a suitably programmed processor or programmable controller, such as a microprocessor or microcontroller provided with the solid-state light source.

These and other aspects of the invention will be apparent from and elucidated with reference to the embodiment(s) described hereinafter.

DESCRIPTION

Figure 1:
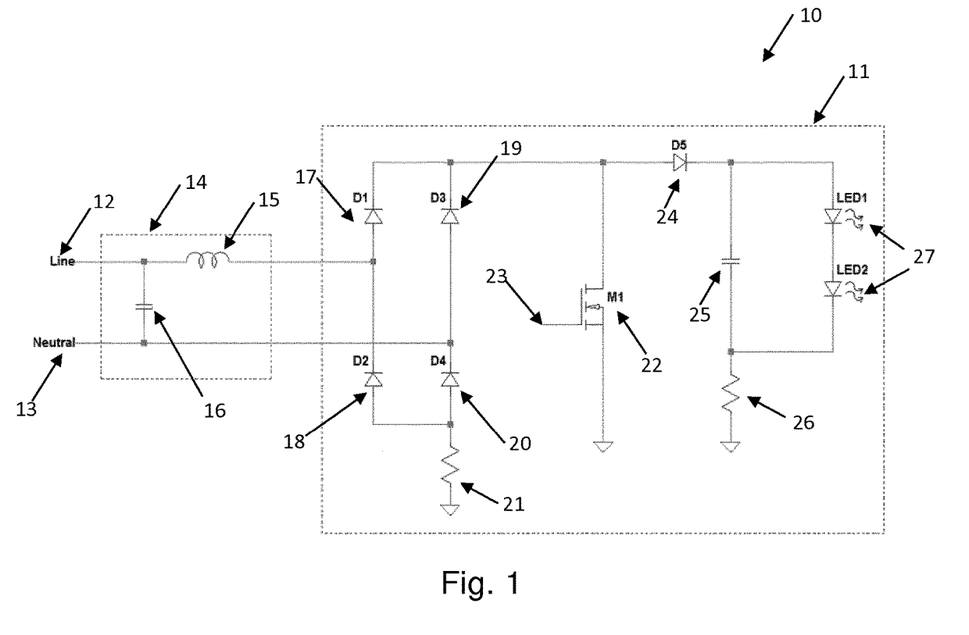
FIG. 1 shows a schematic diagram of an example of the Light Emitting Diode, LED, based lighting device arranged for mains dip detection.

FIG. 1 shows a schematic diagram of an example of the Light Emitting Diode, LED, lighting device arranged for mains dip detection.

Reference number 10 indicates the electronic schematic layout of the LED lighting system which is arranged for detecting a dip in the mains voltage. Such a system comprises a LED lighting device 11 which is connected to a ballast 14. The ballast, in turn receives input power from a source of electrical energy such as a mains line. The mains power supply comprises a line 12 and a neutral 13. As is common practice, it is indicated that the lighting device receives power supply from a single phase power supply indicated by the line 12 and the neutral 13. However, if so desired, the device may also be designed to receive power from a three phase power supply.

The ballast 14 comprises, or is at least modelled by, an inductor 15 and a capacitance 16. The purpose of the inductance 15 is to ensure a reasonable steady supply of current to the lighting device 11 and that of the capacitance 16 is to improve the power factor of the system. The current supplied to the LED lighting device 11 by the ballast 14 is an alternating current, AC, i.e. ballast current, and this current needs to be rectified before being supplied to the LED array 27.

The rectifier comprises diode 17, 18, 19 and 20. Together, they constitute a full wave rectifier or a bridge rectifier. The rectifier 17, 18, 19, 20 has an input and an output, wherein the rectifier is arranged to receive an AC voltage at its input, to convert the AC voltage to a DC voltage, and to provide the DC voltage to at least one LED. The rectifier 2 comprises example four diodes for rectifying the AC voltage to a DC voltage.

In certain cases, at least two diodes in two different branches may be replaced by controllable switches such as transistors or MOSFETs. Doing so has an advantage of controlling the amount of power being supplied to the at least one LED, i.e. the LED array 27, and variable brightness levels of the LED array can be achieved by controlling the ON times of said controllable switches. In such a scenario, the control signal for the controllable switches may be provided by the same control unit or a different dedicated control unit.

The rectified current, i.e. the lamp current, is supplied to the array of LEDs 27. The array of LEDs 27 may comprise one or more LEDs arranged in a suitable manner in order to provide light. The supplied lamp current is transmitted to the LEDs through a diode 24. The diode is introduced in the path of the current flow in order to prevent a flow of current in the reverse direction from buffer capacitor 25 which could damage other electronic components such as the rectifier and the ballast.

Shunt switch 22 is introduced in a path parallel to the at least one LED 27. The shunt switch 22 is arranged for shunting the excess power that may be supplied by the ballast. It is preferable that the shunt switch is controllable. The control signal that controls the shunt switch 22 may be supplied via terminal 23. The control signal, in turn, may be generated via a control unit or a control device such as a microcontroller, microprocessor or a Field Programmable Gate Array, FPGA (not shown in figure).

When said control switch is activated or in an ON state, it provides a shorter path of least resistance to the current and thereby current flows directly to the ground, thereby not flowing through the at least one LED 27. Similarly, when the shunt switch is deactivated, or in an OFF state, the lamp current flows through the LEDs thereby providing a light output.

The capacitance 25 is an optional feature that may be introduced in parallel to the LED array 27. When introduced, the capacitor may store charge when an input current is available from the ballast 14 or when the shunt switch 22 is deactivated or in an OFF state. When the shunt switch is in activated or in an ON state, the LED array 27 may be powered for a short duration by the capacitor 25. This also ensures that a uniform voltage is maintained across the LED array 27.

Finally, the mains dip is detected by sensing current through a sense resistor 21. This detects the zero current instances in the lamp current, thereby enabling the control unit (Not shown in figure) to take suitable actions.

Figure 2:
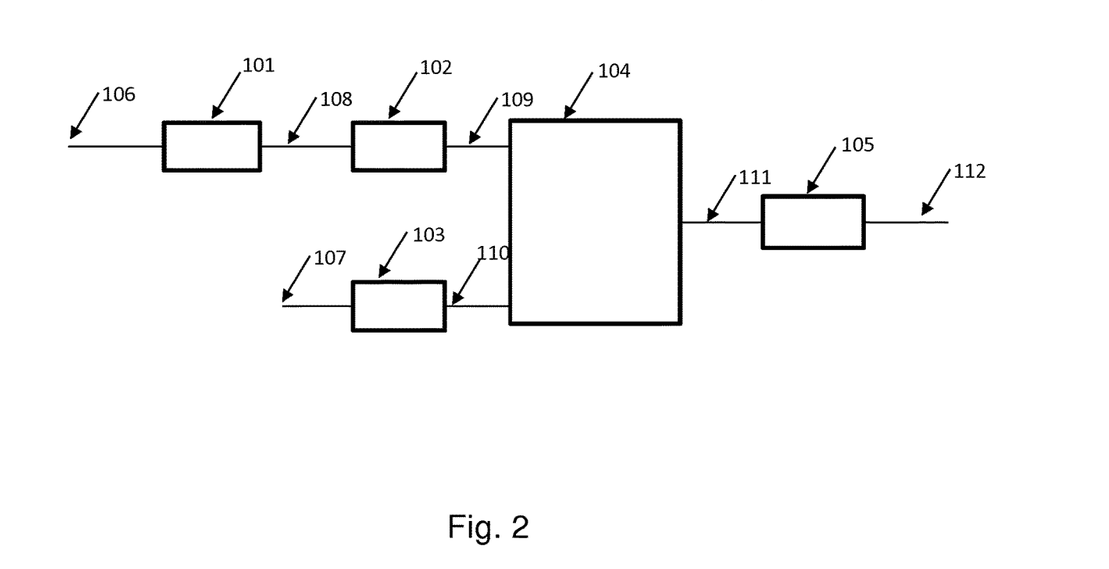
FIG. 2 shows a high level block diagram of a system comprising a LED based lighting device arranged for mains dip detection.

In FIG. 2, reference number 100 depicts a high level block diagram of a system comprising a LED lighting device arranged for mains dip detection. The lamp current 106 is provided to a zero current detector 101. The zero current detector 101 is arranged for detecting an occurrence of a zero magnitude of the current. This may be achieved by using a comparator, by comparing the current value to reference input of zero amperes. Alternately, the same functioning could also be achieved by employing a zero crossing detector. The functioning of both, a comparator and a zero crossing detector are well known to the person skilled in the art and hence not elaborated further. The zero current detector 101, at instances of zero value in the lamp current 106, produces triggers for node 108. Since the input lamp current is periodic, it may be reasonably well assumed that the triggers are also repeated at a fixed periodic interval.

The triggers at node 108 are passed on to a signal generator 102. The signal generator 102, outputs a monotonic waveform starting from a base level rising to a reset level. The signal generator 102 output is reset every time it encounters a trigger at its input 108. The monotonic waveform signal is available at the output node 109. This signal is fed to a comparator 104. The reference level for the comparator is provided by an error amplifier 103.

The comparator 104 provides its output signal 111 to the gate driver 105. The gate driver 105 at its output 112 provides a signal that controls at least a shunt switch (not shown in figure).

Figure 3:
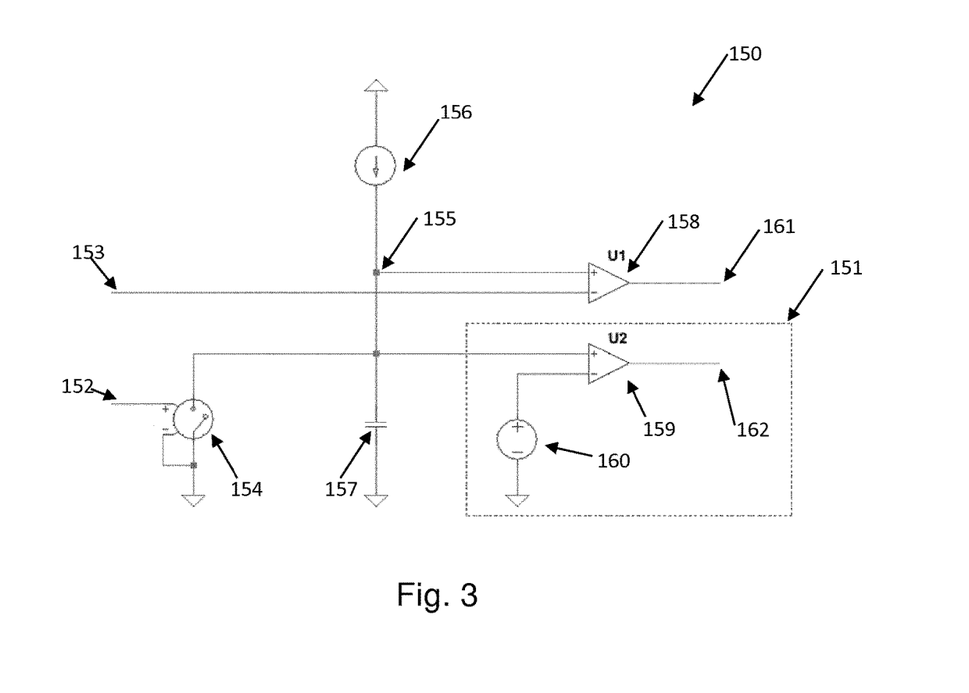
FIG. 3 shows a schematic diagram a part of the LED based lighting device arranged for mains dip detection.

FIG. 3 shows a schematic diagram a part of the LED based lighting device arranged for mains dip detection.

Reference number 150 indicates a part of the LED based lighting device that is arranged for mains dip detection. In this embodiment, a signal generator produces a saw tooth waveform, wherein the outputted waveform signal rises in a linear fashion from a zero level before being reset back to the zero level. Under a first state of operation, the current source 156, supplies charge to the capacitor 157, the capacitor 157 thereby accumulating charge. This charge increases in a linear fashion with respect to time. When the zero current detector (not shown in figure) detects a zero value of the lamp current, it activates switch 154 via pin 152. When switch 154 is activated, the charge stored in capacitor 157 is reset. Furthermore, it also provides a path of low resistance to the current source 156 thereby preventing the further charging of the capacitor. When the zero current situation has been removed, the switch is deactivated, therefore charging the capacitor again.

The charging and discharging cycle of the capacitor produces a waveform resembling a saw tooth at node 155. This waveform is then compared with certain reference values in order for mains dip detection. The waveform outputted by the signal generator is compared, in a first instance, to a first reference value by a first comparator 158. This reference value is provided at terminal 153. This first reference value provides a level at which the shunt switch (not shown in figure) is activated. When the magnitude at node 155 exceeds the first reference level provided at 153, the comparator 158 at its output 161 provides a signal whereby the shunt switch is activated. When switch 154 is activated, the voltage at node 155 falls to zero and also below the first reference level, thereby, the first comparator 158 determines that the voltage is below the reference level and the shunt switch is deactivated again.

However, during the occurrence of a mains dip, the zero current detector does not detect a zero and therefore, the signal generator is not reset. This causes the output of the signal generator to increase, or decrease, monotonically depending on the configuration of the signal generator. For the purpose of explanation, it is assumed that the signal generator is a non-decreasing waveform, however the application and the explanation applies mutatis mutandis to a non-increasing waveform as well.

The voltage at node 155 goes beyond the reset level. A second threshold is provided by means of fixed reference level 160. This second reference level 160 is chosen such that it is between 1.1 and 1.5 times the reset level, preferably it is between 1.1 and 1.2 times the reset level. When the voltage at node 155 crosses this second threshold, the second comparator 159 is activated, thereby deactivating the shunt switch. This ensures current flow into the LED and successful detection of a mains dip. Alternately, the signal at the output 162 of the second comparator 159 may alternately be provided to other warning and/or display mechanism that indicate to the user or other maintenance personnel (not shown in figure), the occurrence of a mains dip. Additionally, the signal may be provided to a data logging system (not shown in figure), that is able to keep track of the instances and repeated occurrences of mains dip within the system.

Figure 4:
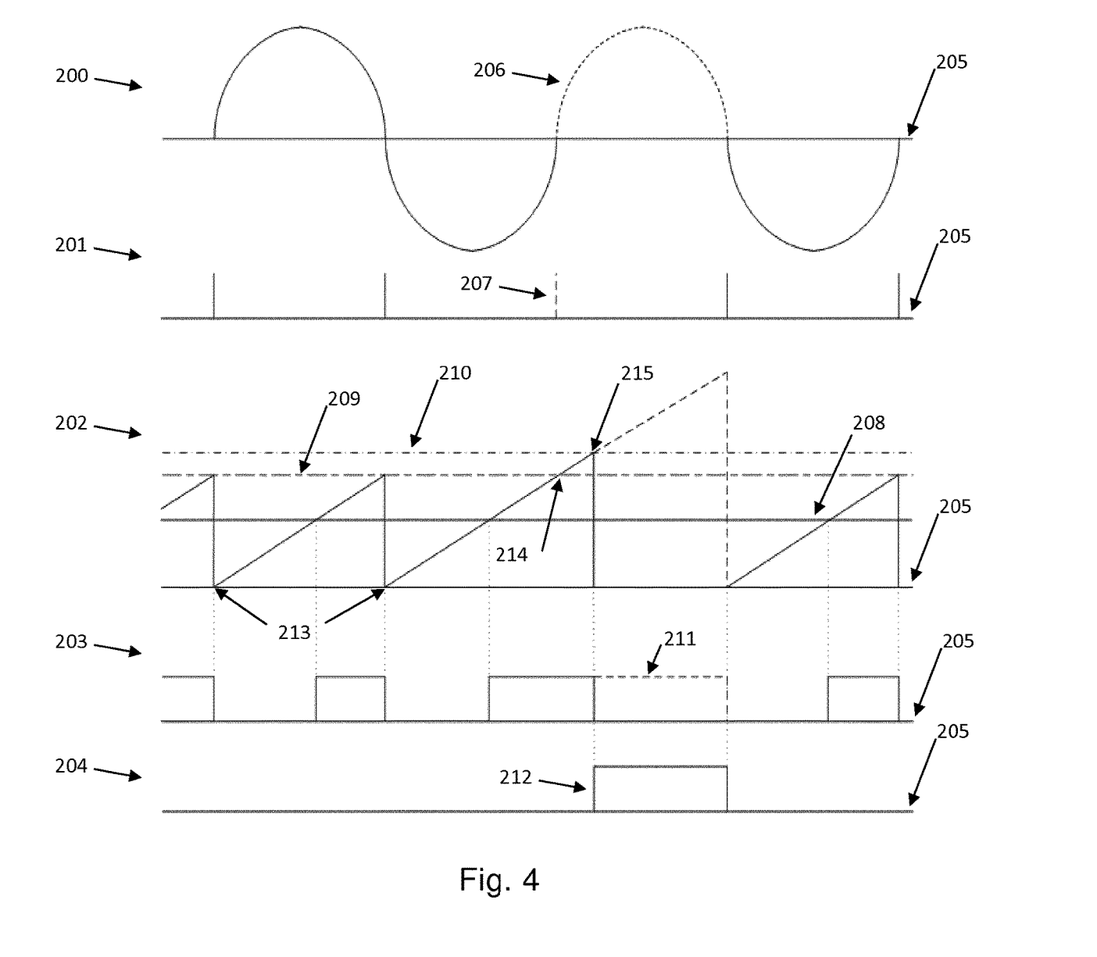
FIG. 4 shows sample waveforms at various nodes of the system.

FIG. 4 shows sample waveforms at various nodes of the system. In all figures, 200-204, axis 205 represents time and therefore all the waveforms are shown with respect to change in time. Reference number 200 indicates the input current waveform. Within it, 206 refers to the instance of occurrence of a mains dip. During this instance, the current more or less remains constant. Reference number 201 indicates the output of the zero current detector. As can be seen, it generates triggers when the current 200 crosses a zero value.

From the figure, it is clear that at instance 207, the trigger is missing, since there is no zero current when a mains dip occurs. The output of a signal generator is shown in 202. It rises from a base level 213 to a reset level 209 when it is reset back to said base level 213. The time taken to rise from the base level 213 to the reset level 209 corresponds to the timing between two successive triggers generated by the zero current detector. When the waveform 202 reaches an intermediary level 208, the shunt switch is activated and it is deactivated when the waveform falls below this reference level.

The timing diagram for the activation and deactivation of said shunt switch is shown in reference number 203. When a mains dip occurs, the zero current detector does not provide a trigger, therefore the signal generator is not reset and keeps on increasing beyond the reset level.

A second mains dip threshold level is provided at 210. The signal generator should have been reset at instance 214, but due to the missing zero current detection trigger, it is eventually reset at 215 when it finally crosses the mains dip threshold level 210. Finally, reference number 204 indicates the duration for which the mains dip signal is available. The control unit (not shown in figure) generates a control signal 212 for the duration of detection of a mains dip. This signal 212 is reset when a further zero current detection trigger is detected. In other words, the control unit determines that a mains dip has occurred when the amplitude of the output of the signal generator reaches a mains dip threshold level 210 and the control unit determines a mains dip to have occurred until another zero current event is detected. As discussed earlier, the control signal may be used to perform any of a variety of functions including indicating and/or controlling.

Figure 5:
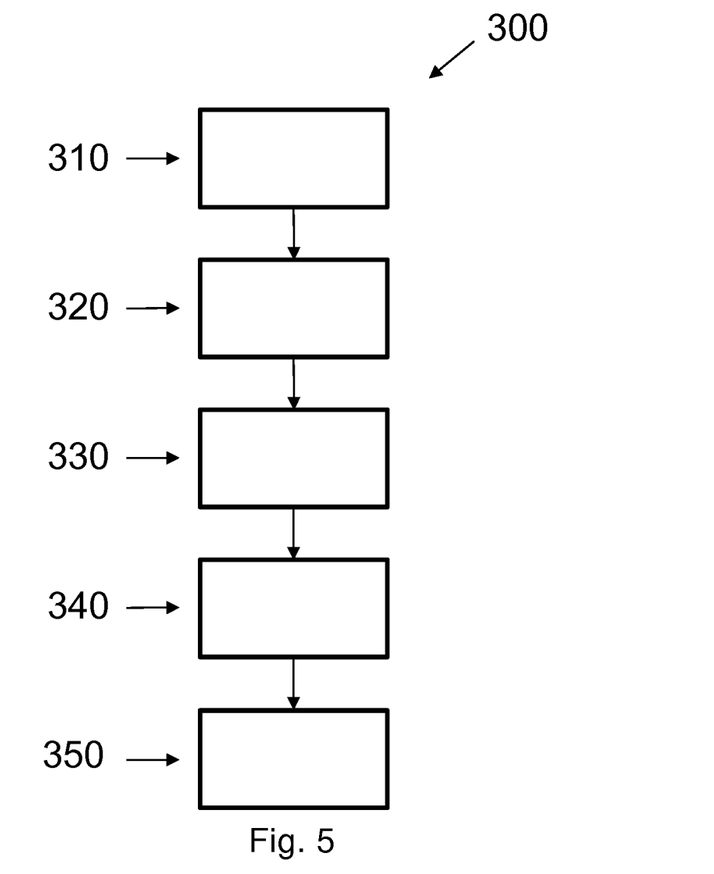
FIG. 5 shows a high level block diagram for the implementation of a method for detecting mains dip in an LED based lighting device.

In FIG. 5, reference number 300 shows a high level block diagram for the implementation of an exemplary method for detecting mains dip in an LED based lighting device.

The first step 310 is that of rectifying the ballast current by the rectifier. Step 320 refers to the detection of a zero current in the lamp current or the ballast current by the zero current detector. Upon detection of a zero current, the zero current detector produces a trigger signal. This trigger signal is then coupled to a signal generator. In step 330, the signal generator outputs a monotonic waveform. The monotonic waveform starts from a base level. The signal generator is reset every time, the signal generator receives a trigger from the zero current detector. Upon the occurrence of a mains dip, the current more or less remains constant, or does not fall to a zero level. This means that a corresponding trigger will not be generated at step 320. In turn, the signal generator is not reset causing the output waveform to go beyond a nominal reset level and approach a second mains dip threshold.

In step 340, a control unit determines when the output voltage of the signal generator reaches a mains dip threshold voltage, that a mains dip has occurred. In a further embodiment, the method may further include the step of controlling a shunt switch upon the determination of a mains dip by the control unit. This is represented by step 350. In this step, upon detection of a mains dip, suitable action is taken by the control unit. The suitable action may include one or more of:

activating a protective mechanism in order to prevent damages to the system, deactivating a shunt switch, thereby increasing voltage applied to the Electromagnetic ballast, indicating to an external user or maintenance personnel, the occurrence of a mains dip, indicating to a data logging system, the occurrence of a mains dip.

Other variations to the disclosed embodiments can be understood and effected by those skilled in the art in practicing the claimed invention, from a study of the drawings, the disclosure, and the appended claims, In the claims, the word "Comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The invention claimed is:

1. A retrofit light emitting diode (LED), lighting device for connection to a ballast, wherein said ballast is arranged to be connected to a mains voltage and arranged to provide for a ballast current, wherein said LED lighting device is arranged to detect a dip in said mains voltage, said retrofit LED lighting device comprises:
    at least one LED for emitting light;
    a rectifier arranged for rectifying said ballast current and for providing a lamp current to said at least one LED;
    a zero current detector arranged for detecting a zero value of said lamp current or of said ballast current;
    a signal generator coupled to said zero current detector, wherein said signal generator is arranged for outputting a monotonic wave form signal starting from a base level, wherein said signal generator is arranged to reset said outputted wave form signal from a reset level to said base level upon said detected zero value by said zero current detector;
    a control unit arranged for determining the dip in said mains voltage by determining that said outputted wave form signal crosses a voltage dip threshold after having passed said reset level; and
    a shunt switch for shunting said at least one LED such that said lamp current bypasses said at least one LED.

2. The retrofit LED lighting device according to claim 1, wherein
    a) said signal generator is arranged for outputting a monotonic increasing wave form, and wherein said voltage dip threshold is higher than said reset level, or
    b) said signal generator is arranged for outputting a monotonic decreasing wave form, and wherein said voltage dip threshold is lower than said reset level.

3. The retrofit LED lighting device according to claim 1, wherein said control unit is further arranged for controlling said shunt switch based on said determined dip in said mains voltage.

4. The retrofit LED lighting device according to claim 3, wherein said control unit is arranged for:
    deactivating said shunt switch triggered by a detected zero value,
    deactivating said shunt switch triggered by said determined dip in said mains voltage, and
    activating said shunt switch triggered by determining that said outputted wave form crosses an activation threshold before said outputted wave form reaches said reset level.

5. A method of operating said retrofit LED lighting device in accordance with claim 3, wherein said method comprises the step of:
    controlling, by said control unit, said shunt switch based on said determined dip in said mains voltage.

6. The method of operating said retrofit LED lighting device in accordance with claim 5, wherein said method further comprises the steps of:
    deactivating said shunt switch triggered by a detected zero value,
    deactivating said shunt switch triggered by said determined dip in said mains voltage, and
    activating said shunt switch triggered by determining that said outputted wave form crosses an activation threshold before said outputted wave form reaches said reset level.

7. The retrofit LED lighting device according to claim 1, wherein said voltage dip threshold is between 1.1 and 1.5, preferably between 1.1 and 1.2, times said reset level.

8. The lighting system, comprising:
    said retrofit LED lighting device according to claim 1, and
    a ballast connected to said retrofit LED lighting device.

9. A method of operating said retrofit LED lighting device in according to claim 1, wherein said method comprises the steps of:
    rectifying, by said rectifier, said ballast current and providing a lamp current to said at least one LED;
    detecting, by said zero current detector, a zero value of said lamp current or of said ballast current;
    outputting, by said signal generator, a monotonic wave form signal starting from a base level, and resetting, by said signal generator, said output signal from a reset level to said base level upon a detected zero value by said zero current detector; and determining, by said control unit, a dip in said mains voltage by determining that said outputted wave form crosses a voltage dip threshold after having passed said reset level.

10. The method of operating said retrofit LED lighting device in accordance with claim 9, wherein said step of outputting comprises any of:

outputting, by said signal generator a monotonic increasing wave form, outputting, by said signal generator a monotonic decreasing wave form.

11. The method of operating said retrofit LED lighting device in accordance with claim 9, wherein said voltage dip threshold is between 1.1 and 1.5, preferably between 1.1 and 1.2, times said reset level.

* * * * *